US008107752B2

(12) United States Patent
Jiao et al.

(10) Patent No.: US 8,107,752 B2
(45) Date of Patent: Jan. 31, 2012

(54) METHOD AND SYSTEM FOR PROCESSING IMAGE AT HIGH SPEED

(75) Inventors: Yueguang Jiao, Beijing (CN); Zihua Guo, Beijing (CN); Wei Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 887 days.

(21) Appl. No.: 12/147,649

(22) Filed: Jun. 27, 2008

(65) Prior Publication Data

US 2009/0003690 A1    Jan. 1, 2009

(30) Foreign Application Priority Data

Jun. 28, 2007 (CN) .......................... 2007 1 0118085

(51) Int. Cl.
*G06K 9/36* (2006.01)
(52) U.S. Cl. ...................................................... 382/238
(58) Field of Classification Search .................. 382/162, 382/166, 167, 232–251; 375/240.01–240.29; 341/67, 65
See application file for complete search history.

(56) References Cited

U.S. PATENT DOCUMENTS

| 5,469,273 A | * | 11/1995 | Demura .................... 382/244 |
| 6,002,438 A | * | 12/1999 | Hocevar et al. .......... 375/240.16 |
| 6,031,938 A | | 2/2000 | Kajiwara |
| 6,285,796 B1 | * | 9/2001 | Acharya et al. ............... 382/246 |
| 6,292,114 B1 | * | 9/2001 | Tsai et al. ........................ 341/67 |

FOREIGN PATENT DOCUMENTS

| JP | 8331389 A | 12/1996 |
| JP | 09116765 A | 5/1997 |
| JP | 2002199228 A | 7/2002 |
| JP | 2002209111 A | 7/2002 |

* cited by examiner

*Primary Examiner* — Ishrat I Sherali
(74) *Attorney, Agent, or Firm* — Patterson Thuente Pedersen Christensen, P.A.

(57) ABSTRACT

An image processing method and system that performs color space transformation on an image to be compressed and obtaining pixel values, performing intra-row differential pulse code modulation coding on the image pixel values to obtain numerical values, and determining whether each of the numerical values is within a preset range. Variable length coding is performed on the numerical value obtained by using a fixed code table if the numerical value is within the range, variable length and by using a dynamic code table if it is not. Low algorithm complexity and fast processing meets the requirement of real-time video transmission. The pixel components of the image can be processed in parallel and adjacent processing steps can be performed in the same clock frequency, thereby remarkably reducing difficulty and cost in FPGA or chip implementation.

19 Claims, 1 Drawing Sheet

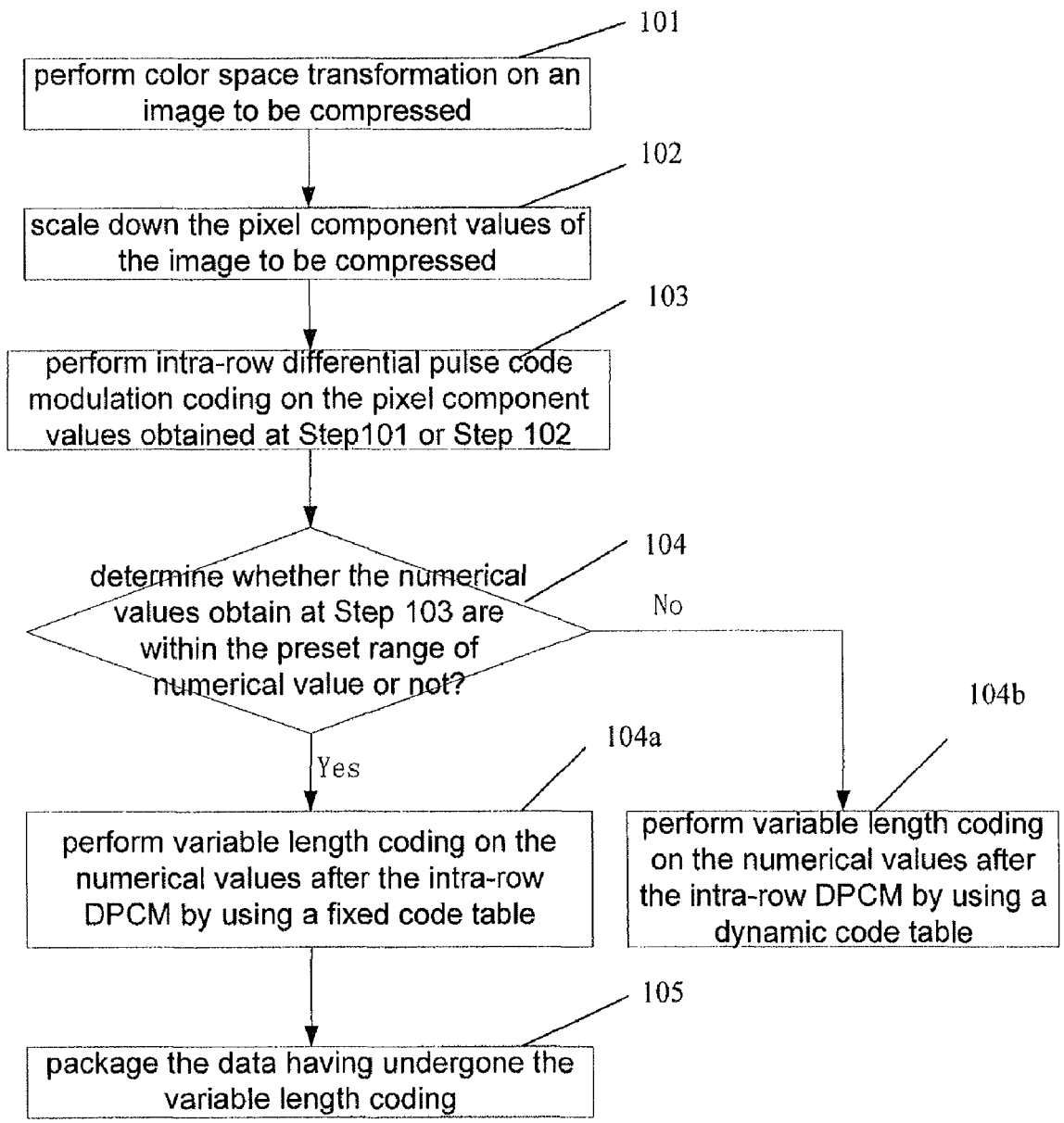

METHOD AND SYSTEM FOR PROCESSING IMAGE AT HIGH SPEED

RELATED APPLICATION

The present application claims priority to Chinese Application No. 200710118085.3 filed Jun. 28, 2007, which is incorporated herein in its entirety by reference.

FIELD OF THE INVENTION

The present invention relates to image compression/decoding technology, in particular to a method for processing images at high speed and a system using the same.

BACKGROUND OF THE INVENTION

Image transmission technology plays a role in a growing number of scenarios with the development of information technology. Raw image data must undergo compression so that the limited transmission bandwidth can transmit a large amount of image information. An image restored from compressed image data is required to be exactly the same as the original one in many application situations, which requires that the compression methods must not cause a loss of information. In other words, they must be lossless.

A variety of lossless compression standards for image compression have been proposed, for example, GIF, JPEG, MPEG, JPEG2000, etc. In GIF, an LZW algorithm is mainly adopted in compression, which is suitable for compressing geometrical graphics, but the compression effect is poor for natural images. The JPEG lossless compression standard utilizes a 2D prediction model and fulfills a compression process by introducing context to adaptively correct predicted values and performing Golomb coding on the residual. MPEG is a compression algorithm suitable for video data. Although it takes into account similarity between frames of moving images, this algorithm results in blurring during a process of handling artificial graphics like text characters. JPEG2000 adopts a scheme of entropy coding after wavelet transformation and quantization.

There are two common disadvantages in the above algorithms. First, they are of high complexity and low encoding/decoding speed, and thus not applicable to scenarios where real-time transmission of images is strictly required. Next, they need powerful computation capability and large storage capacity, thus are difficult for hardware implementation and may cause high cost.

As an example, JPEG lossless compression uses a 2D prediction model, which implies that pixel information on the preceding row must be temporarily stored during image processing. It will cost considerable overhead resources if the algorithm is implemented in hardware. Further, the use of Hoffman coding or arithmetic coding complicates the realization in hardware. Since the compressed codes of image components are stored successively, it is impossible to processing the components in parallel from the perspective of hardware. This impairs the improvement in compression and decompression efficiency.

SUMMARY OF THE INVENTION

An object of the present invention is to provide a method for processing image at high speed which can simplify algorithms and benefit hardware implementation.

Another object of the present invention is to provide a system for processing images at high speed which can support image compression/decoding, simplify algorithms and benefit hardware implementation.

These objects are achieved with the following solutions.

According to one aspect of present invention, an image compression method is provided, comprising steps of: Step A, performing color space transformation on an image to be compressed; Step B, performing intra-row differential pulse code modulation coding on image pixel values obtained at Step A; and Step C, determining whether each of numerical values obtained at Step B is within a preset range of numerical values or not; and if it is, performing variable length coding on the numerical value obtained after the intra-row differential pulse code modulation by using a fixed code table; and if it is not, performing variable length coding on the numerical value after the intra-row differential pulse code modulation by using a dynamic code table.

According to another aspect of present invention, an image compression system is provided, comprising a color space transformation module for performing color space transformation on an image to be compressed, a coding module for performing intra-row differential pulse coding on image pixel component values obtained after the color space transformation, and a determination module for determining whether each of pixel component values obtained after the intra-row differential pulse coding by the coding module is within a preset range of numerical value or not and sending a corresponding instruction to the coding module at the same time, the coding module performs variable length coding on the pixel component values obtained after the intra-row differential pulse coding by using a fixed code table or a dynamic code table, according to the instruction from the determination module.

According to another aspect of present invention, it is provided an image decoding method comprising steps of: Step a, determining whether each of pixel component values of a compressed image belongs to a fixed code table or a dynamic code table, and performing variable length decoding on the pixel component value if an answer is YES, Step b, performing intra-row differential pulse code modulation decoding on pixel component values obtained after the variable length decoding, and Step c, performing inverse color space transformation on the pixel values obtained at Step b.

According to another aspect of the present invention, an image decoding system is provided, comprising a determination module for determining whether each of the pixel component values of a compressed image belongs to a fixed code table or a dynamic code table, and sending a corresponding instruction to a decoding module if it belongs, a decoding module for performing variable length decoding on the pixel component values of the image, and then performing differential pulse code modulation decoding, and a color space transformation module for performing color space transformation on the scaled-up pixel component values.

The image processing method and system of the present invention have low algorithm complexity and fast compress/decoding processes. The requirement of real-time video transmission can be met since a variable length coding/decoding method is adopted in which a fixed code table and a dynamic code table are combined. Meanwhile, result components of image pixels after the variable length coding are packaged so that these components can be processed in parallel, and adjacent processing steps may be performed in the same clock frequency to reduce difficulty and cost in FPGA (Field Programmable Gate Array) or chip implementation.

BRIEF DESCRIPTION OF THE DRAWINGS

FIG. 1 is a schematic flowchart of an image compression method of the present invention.

DETAILED DESCRIPTION OF THE PREFERRED EMBODIMENTS

In the image compression method of the present invention, the steps include first performing color space transformation on an image to be compressed, scaling down the pixel component values of the image to be compressed, performing intra-row differential pulse code modulation encoding, and then performing variable length coding on numerical values having undergone the intra-row differential pulse code modulation encoding in the manner of combining a fixed code table and a dynamic code table.

FIG. 1 is a schematic flowchart of an image compression method of present invention. As shown in FIG. 1, the method comprises the following steps.

Step 101, performing color space transformation on an image to be compressed. Supposed that an original RGB image has a pixel format of 8:8:8, i.e., values of R, G and B are each represented with 8 bits, each pixel is subjected to a transformation from RGB to YUV in a row-by-row fashion. A formula of the transformation is:

$$y = \left\lfloor \frac{r = 2g + b}{4} \right\rfloor \quad (1)$$
$$u = b - g$$
$$v = r - g$$

Where $\lfloor \ \rfloor$ is a floor operator, each of r, g, b is a value obtained by representing the corresponding one of the $R_1$, $G_1$, B components as an 8 bit unsigned integer.

Step 102, scaling down the pixel component values of the image to be compressed.

In this optional step, each of the pixel components values is divided by a fixed constant. According to a fact that human eyes are sensitive to variation of luminance but insensitive to variation of chroma, the constant is generally selected to be 1 or 2 for Y component and 1, 2 or 4 for U and V components. The algorithm is lossless when the constant is chosen as 1 for the three components.

Step 103, performing intra-row differential pulse code modulation coding on the pixel component values obtained at Step 101 or Step 102.

DPCM (Differential Pulse Code Modulation) is a method which uses linear prediction to reduce spatial correlation and code redundancy for an image. The present invention employs a simplest linear prediction method, that is $$\hat{I}_i = I_{i-1} \quad (2)$$

Where I denotes the predicted value of some component (may be anyone of y, u, v) of the i-th pixel in the current row, $I_{i-1}$ denotes an actual value of the corresponding components of the (i−1)-th pixel. Thus, a prediction error is $$I^{(i)}_{DPCM} = I_i - \hat{I}_i = I_i - I_{i-1} \quad (3)$$

Where $I^{(i)}_{DPCM}$ is a prediction error for the i-th pixel, i.e., the value obtained after the differential coding. For the first pixel in each row, it is set $I^{(1)}_{DPCM} = I_1$.

Specifically, the details of the encoding process is, for the first pixel in each row, the Y, U, V values are used directly as encoded values, and for each subsequent pixel in each row, the Y, U, V values minus the corresponding values of the preceding pixel are used as encoded values.

Step 104, determining whether the numerical values obtained at Step 103 are within the preset range of numerical value or not; if they are, performing variable length coding on the numerical values after the intra-row DPCM by using a fixed code table; and if they are not, performing variable length coding on the numerical values after the intra-row DPCM by using a dynamic code table.

Variable length coding (UVLC) means assigning a shorter codeword to a value of higher appearance frequency and a longer codeword to a value of lower appearance frequency. It may be adapted to various types of images in a statistical sense.

The present invention employs a combination of the fixed code table and the dynamic code table in the variable length coding. The used fixed code table is one type of exponential Golomb (Exp-Golomb) code and generated according to the following rule:

the number of code having a code length of 1 is 1, and its binary code is 1;

the number of codes each having a code length of 3 is 2, and their binary codes are 001 and 011, which are generated by attaching 00 and 01 to the head of the code having a code length of 1;

the number of codes each having a code length of 5 is 4, and their binary codes are 00001, 00011, 01001 and 01011, which are generated by attaching 00 and 01 to the head of each code having a code length of 3;

and so on . . .

the number of codes each having a code length of 2n+1 is $2^n$, and the codes are generated by attaching 00 and 01 to the head of each code having a code length of 2n−1.

If the first 5 bits of a code is 01010, the code is deleted from the code table, since 01010 has been used as a prefix for dynamic codes. According to the principle that "the shorter the code length is, the smaller the absolute value of the corresponding numerical value", the code table after the deletion is made corresponding to the post-DPCM numerical values, as shown in Table 1.

TABLE 1

| Numerical value | Code (binary) | Numerical value | Code (binary) |
|---|---|---|---|
| 0 | 1 | | |
| +1 | 001 | −1 | 011 |
| +2 | 00001 | −2 | 00011 |
| +3 | 01001 | −3 | 01011 |
| +4 | 0000001 | −4 | 0000011 |
| +5 | 0001001 | −5 | 0001011 |
| +6 | 0100001 | −6 | 0100011 |
| deleted | 0101001 | deleted | 0101011 |
| +7 | 000000001 | −7 | 000000011 |
| +8 | 000001001 | −8 | 000001011 |
| +9 | 000100001 | −9 | 000100011 |
| +10 | 000101001 | −10 | 000101011 |
| +11 | 010000001 | −11 | 010000011 |
| +12 | 010001001 | −12 | 010001011 |
| deleted | 010100001 | deleted | 010100011 |
| deleted | 010101001 | deleted | 010101011 |

The used dynamic code table is associated with the corresponding components of the preceding pixel and generated by attaching a prefix code 01010 to the head of the binary representation of $I^{(i)}_{DPCM} + I_{i-1}$. Here, $I^{(i)}_{DPCM}$ is the DPCM-coded value of some component of the current pixel, and $I_{i-1}$ is the value of the corresponding component of the preceding pixel. In other words, the coding is performed by attaching the prefix code to the original value of the current pixel component before the DPCM, since $I^{(i)}_{DPCM}=I_i-I_{i-1}$.

In an embodiment, a length of Exp-Golomb code is selected as 1-9, and 31 codes are thus obtained, in which 6 codes are deleted, and the remaining 25 codes correspond to the numerical values −12−+12, respectively. The numerical values beyond the range are coded using the dynamic code table.

The value range for Y components is [0, 255], each of which may be represented as an 8-bit unsigned binary number and coded as a 13-bit binary number including the prefix code. The value range for each of U, V components is [−255, 255], each of which may be represented as a 9-bit signed binary number and coded as a 14-bit binary number including the prefix code.

Step 105, packaging the data obtained by the variable length coding.

The purpose of packaging the data is to facilitate transmission and processing in hardware. The minimum unit of package is CELL having a size of 32 bits.

Codes carried in each CELL come from only one of Y, U, V components of a pixel. Codes for different components cannot be packaged in one CELL. The most significant two bits in a CELL labels the type of the data to indicate which component of the pixel the carried data is. Table 2 shows correspondence between the codes of the most significant two bits and the carried color components of the pixel.

TABLE 2

| Code (binary) | Represented color component |
| --- | --- |
| 00 | Y |
| 01 | U |
| 10 | V |
| 11 | Invalid |

The filling of valid data begins with the third bit. The codes are filled in the order that the corresponding pixels are arranged in a row. If the rest of the bits of a CELL cannot accommodate a next binary code, the rest of the bits are all set to be 0, and the next binary code is placed in the next CELL. When one row of the image has been completely processed, the rest of the bits at the end of the last CELL are all set to be 0.

With the above solution, the three color components may be processed in parallel during hardware implementation. The CELL which is first filled up is first transmitted no matter to which component the CELL belongs, regardless an order of the CELLs of the components. Respective components of one pixel may be arranged in a final code stream in a random order, while the corresponding components of different pixels may be arranged in the final code stream in the same order that the pixels are arranged in the image.

To implement the above image compression method, the present invention also provides an image compression system comprising:

a color space transformation module for performing color space transformation on an image to be compressed, a pixel compression module for scaling down the pixel component values of the image to be compressed after the color space transformation, a coding module for performing intra-row differential pulse coding on the pixel component values compressed by the pixel compression module, a determination module for determining whether the pixel component values obtained after the intra-row differential pulse coding by the coding module are within a preset range of numerical value or not and sending a corresponding instruction to the coding module at the same time, and a packaging module for packaging the data obtained after variable length coding by the coding module.

The coding module performs variable length coding on the pixel component values obtained after the intra-row differential pulse coding by using a fixed code table or a dynamic code table, according to instruction from the determination module.

In the above solution, the pixel compression module is optional, and the fixed code table is an Exp-Golomb code table.

With respect to the image compression method and system described above, the present invention further provides the corresponding image decoding method and system, which will be particularly explained as follows.

The image decoding method is actually an inverse operation of the above image compression method and thus comprises the following steps.

Step 1, un-packaging the compressed image.

A CELL is taken out of the compressed code stream, and determination is made as to which component of the pixel is represented by the data in the CELL according to the most significant two bits of the CELL with reference to Table 2.

Step 2, determining whether the pixel component values obtained at Step 1 belong to the fixed code table/the dynamic code table or not, and perform variable length decoding on the unpackaged pixel component values if the answer is YES.

The decoding is performed with reference to Table 1. If an identical codeword is found in Table 1, the numerical value corresponding to the codeword is the result of the decoding. If no identical codeword is found in Table 1, the first 5 bits of the code are checked to see whether they are 01010 or not. If they are, the value of the unsigned number represented by the following 8 bits minus the corresponding component value of the preceding pixel is taken as the decoded numerical value for the Y component, and the value of the signed number represented by the following 9 bits minus the corresponding component value of the preceding pixel is taken as the decoded numerical value for the U or V components. If the first 5 bits of the code are not 01010, there is an error in the compressed code stream, and error processing is performed.

Step 3, performing DPCM decoding on the pixel component values obtained after the variable length decoding.

The value of the first pixel is obtained directly from the UVLC decoding, and the values of the rest of the pixels are each obtained by adding the UVLC-decoded value and the value of the preceding pixel.

Step 4, scaling up the pixel component values obtained at Step 3.

The decoded pixel values are each multiplied by the constant used in the scale-down to restore the original value.

Step 5, performing an inverse color space transformation on the pixel values obtained at Step 4.

Each of the pixels is subjected to the inverse transformation from YUV to RGB in a row-by-row fashion using the following formula of YUV to RGB transformation.

$$g = y - \left[\frac{u=v}{4}\right] \tag{4}$$

$$r = v + g$$

$$b = u + g$$

The color space transformations for RGB through the formulas (1) and (4) are lossless.

The image decoding system for implementing the above image decoding method is similar to the image compression system, except that the packaging act in the image compression system is replaced with an un-packaging operation in the image decoding system, the coding act is replaced with an decoding act, and the scale-down act is replaced with a scale-up act. The image decoding system comprises:

an un-packaging module for un-packaging the compressed image, a determination module for determining whether the unpackaged pixel component values belong to the fixed code table/the dynamic code table or not, and sending the corresponding instruction to a decoding module if they belong, a decoding module for performing variable length decoding on the unpackaged pixel component values and then performing DPCM decoding, a pixel scale-up module for scaling up the DPCM-decoded pixel component values, and a color space transformation module for performing color space transformation on the scaled-up pixel component values.

In the above solution, the fixed code table is the Epx-Golomb code table.

The forgoing description is merely a preferred embodiment of present invention and not intended to limit the scope of the present invention.

What is claimed is:

1. An image compression method comprising the steps of:
   Step A, performing color space transformation on an image to be compressed;
   Step B, performing intra-row differential pulse code modulation coding on image pixel values obtained at Step A to yield numerical values; and
   Step C, determining whether each of numerical values obtained at Step B is within a preset range of numerical values or not; and if it is, performing variable length coding on the numerical value obtained after the intra-row differential pulse code modulation by using a fixed code table; and if it is not, performing variable length coding on the numerical value after the intra-row differential pulse code modulation by using a dynamic code table.

2. The image compression method according to claim 1 further comprising the step of packaging the data obtained after the variable length coding.

3. The image compression method according to claim 2, wherein said fixed code table is an Epx-Golomb code table.

4. The image compression method according to claim 3, wherein said dynamic code table uses a code obtained by adding a prefix code to an original value of the current pixel component that has not undergone the differential pulse code modulation.

5. The image compression method according to claim 4, wherein said prefix code is 01010.

6. The image compression method according to claim 5, wherein a packaging unit used in the step of packaging is a cell in which the most significant two bits are used to identify a type of color component.

7. The image compression method according to claim 1, wherein,
   the method further comprises step of B0, scaling down the pixel component values of the image to be compressed, and wherein Step B0 occurs before Step B.

8. An image compression system comprising:
   a processor, the processor including a memory having the following modules:
   a color space transformation module for performing color space transformation on an image to be compressed;
   a coding module for performing intra-row differential pulse coding on image pixel component values obtained after the color space transformation; and
   a determination module for determining whether each of pixel component values obtained after the intra-row differential pulse coding by the coding module is within a preset range of numerical value or not, and sending a corresponding instruction to the coding module at the same time,
   said coding module performing variable length coding on the pixel component values obtained after the intra-row differential pulse coding by using a fixed code table or a dynamic code table, according to the instruction from the determination module.

9. The image compression system according to claim 8, further comprising a packaging module for packaging the data obtained after the variable length coding by the coding module.

10. The image compression system according to claim 9, wherein said fixed code table is an Epx-Golomb code table.

11. The image compression system according to claim 8, further comprising a pixel compression module for scaling down the pixel component values of the image to be compressed obtained after the color space transformation.

12. An image decoding method comprising the steps of:
    Step a, determining whether each of pixel component values of a compressed image belongs to a fixed code table or a dynamic code table, and performing variable length decoding on the pixel component value if an answer is YES;
    Step b, performing intra-row differential pulse code modulation decoding on pixel component values obtained after the variable length decoding; and
    Step c, performing inverse color space transformation on the pixel values obtained at Step b.

13. The image decoding method according to claim 12, further comprising the step of un-packaging the compressed image.

14. The image decoding method according to claim 13, wherein said fixed code table is an Epx-Golomb code table.

15. The image decoding method according to claim 12, wherein the method further comprises the step of c0, scaling up the pixel component values of the image, and wherein Step c0 occurs before Step c.

16. An image decoding system comprising:
    a processor, the processor including a memory having the following modules:
    a determination module for determining whether each of the pixel component values of an compressed image belongs to a fixed code table or a dynamic code table, and sending a corresponding instruction to a decoding module if it belongs;
    a decoding module for performing variable length decoding on the pixel component values of the image, and then performing differential pulse code modulation decoding; and
    a color space transformation module for performing color space transformation on the scaled-up pixel component values.

17. The image decoding system according to claim 16, further comprising:
an un-packaging module for un-packaging the packaged compressed image, and sending the pixel components of the unpackaged compressed image to the determination module.

18. The image decoding system according to claim 17, wherein said fixed code table is an Epx-Golomb code table.

19. The image decoding system according to claim 16, further comprising:
a pixel scale-up module for scaling up the pixel component values obtained after the differential pulse code modulation decoding, and sending the scaled-up result to the color space transformation module.

* * * * *